(12) United States Patent
Wang et al.

(10) Patent No.: US 12,067,167 B2
(45) Date of Patent: Aug. 20, 2024

(54) CONTROLLING HAPTIC RESPONSE TO CONTACT

(71) Applicant: GOOGLE LLC, Mountain View, CA (US)

(72) Inventors: Jianxun Wang, Sunnyvale, CA (US); Debanjan Mukherjee, San Jose, CA (US); Haechang Lee, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/905,669

(22) PCT Filed: Mar. 11, 2020

(86) PCT No.: PCT/US2020/022054
§ 371 (c)(1),
(2) Date: Sep. 6, 2022

(87) PCT Pub. No.: WO2021/183122
PCT Pub. Date: Sep. 16, 2021

(65) Prior Publication Data
US 2023/0152894 A1    May 18, 2023

(51) Int. Cl.
*G06F 3/044*    (2006.01)
*G06F 3/01*    (2006.01)
(52) U.S. Cl.
CPC ............ *G06F 3/016* (2013.01); *G06F 3/0446* (2019.05)

(58) Field of Classification Search
CPC ........ G06F 3/016; G06F 3/0446; G06F 3/041; G06F 3/044
See application file for complete search history.

(56) References Cited

U.S. PATENT DOCUMENTS

| | | |
|---|---|---|
| 9,063,571 B2 | 6/2015 | Birnbaum et al. |
| 9,733,704 B2 | 8/2017 | Cruz-Hernandez et al. |
| 9,733,746 B2 | 8/2017 | Colgate et al. |
| 9,799,279 B1* | 10/2017 | Evans, V ............... G09G 3/035 |
| 10,528,140 B2 | 1/2020 | Yamazaki et al. |
| 10,671,167 B2* | 6/2020 | Hajati ...................... G06F 3/016 |
| 10,860,112 B1* | 12/2020 | Knoppert ................ G06F 3/044 |
| 2005/0187684 A1* | 8/2005 | Hijikata ............... B60N 2/6009 |
| | | 701/1 |
| 2008/0296072 A1* | 12/2008 | Takashima .............. G06F 3/016 |
| | | 178/18.01 |

(Continued)

OTHER PUBLICATIONS

International Search Report and Written Opinion for PCT Application No. PCT/US2020/022054, mailed on Nov. 9, 2020, 11 pages.

*Primary Examiner* — Amy Onyekaba
(74) *Attorney, Agent, or Firm* — Kilpatrick Townsend & Stockton LLP

(57) ABSTRACT

A computing device can include a cover, a texture haptics layer adjacent to the cover, a display layer adjacent to the texture haptics layer, an impact haptics layer adjacent to the display layer, a controller, and a housing enclosing the controller and supporting the cover, the texture haptics layer, the display layer, and the impact haptics layer. The controller can be configured to activate the texture haptics layer in response to an object moving along the cover, control an image presented by the display layer, and activate the impact haptics layer in response to the object contacting the cover.

17 Claims, 11 Drawing Sheets

(56) References Cited

U.S. PATENT DOCUMENTS

| | | | |
|---|---|---|---|
| 2012/0139844 A1* | 6/2012 | Ramstein | G06F 3/016 345/173 |
| 2012/0194483 A1* | 8/2012 | Deluca | G06F 3/043 345/177 |
| 2012/0223880 A1* | 9/2012 | Birnbaum | G06F 3/0346 345/156 |
| 2012/0286944 A1* | 11/2012 | Forutanpour | G06F 3/016 340/407.1 |
| 2012/0306764 A1* | 12/2012 | Kamibeppu | G06F 3/04883 345/173 |
| 2013/0154813 A1* | 6/2013 | Gosline | G06F 3/016 340/407.2 |
| 2013/0314355 A1* | 11/2013 | Inata | G06F 1/1626 345/173 |
| 2014/0176455 A1* | 6/2014 | Araki | G06F 3/0488 345/173 |
| 2015/0205353 A1* | 7/2015 | Feng | G06F 3/0488 345/173 |
| 2015/0293592 A1* | 10/2015 | Cheong | G06F 1/163 345/173 |
| 2016/0018891 A1* | 1/2016 | Levesque | H05K 999/99 345/174 |
| 2017/0277263 A1 | 9/2017 | Levesque et al. | |
| 2017/0357320 A1* | 12/2017 | Chaudhri | G06F 3/04883 |
| 2018/0107378 A1* | 4/2018 | Rosenberg | G06F 3/04144 |
| 2018/0239433 A1* | 8/2018 | Akabane | G06F 3/045 |
| 2018/0322444 A1* | 11/2018 | Todeschini | G06F 3/014 |
| 2019/0027674 A1* | 1/2019 | Zhang | G06F 1/1643 |
| 2019/0033971 A1* | 1/2019 | Reynolds | G06F 3/0443 |
| 2019/0250752 A1 | 8/2019 | Shim et al. | |
| 2019/0317177 A1* | 10/2019 | Ertan | G01S 13/75 |
| 2019/0332176 A1* | 10/2019 | Yang | G06F 3/016 |
| 2020/0050272 A1* | 2/2020 | Choi | G06F 3/0488 |
| 2020/0103972 A1* | 4/2020 | Amin-Shahidi | G06F 3/0346 |
| 2021/0208682 A1* | 7/2021 | Knoppert | G06F 3/0202 |

* cited by examiner

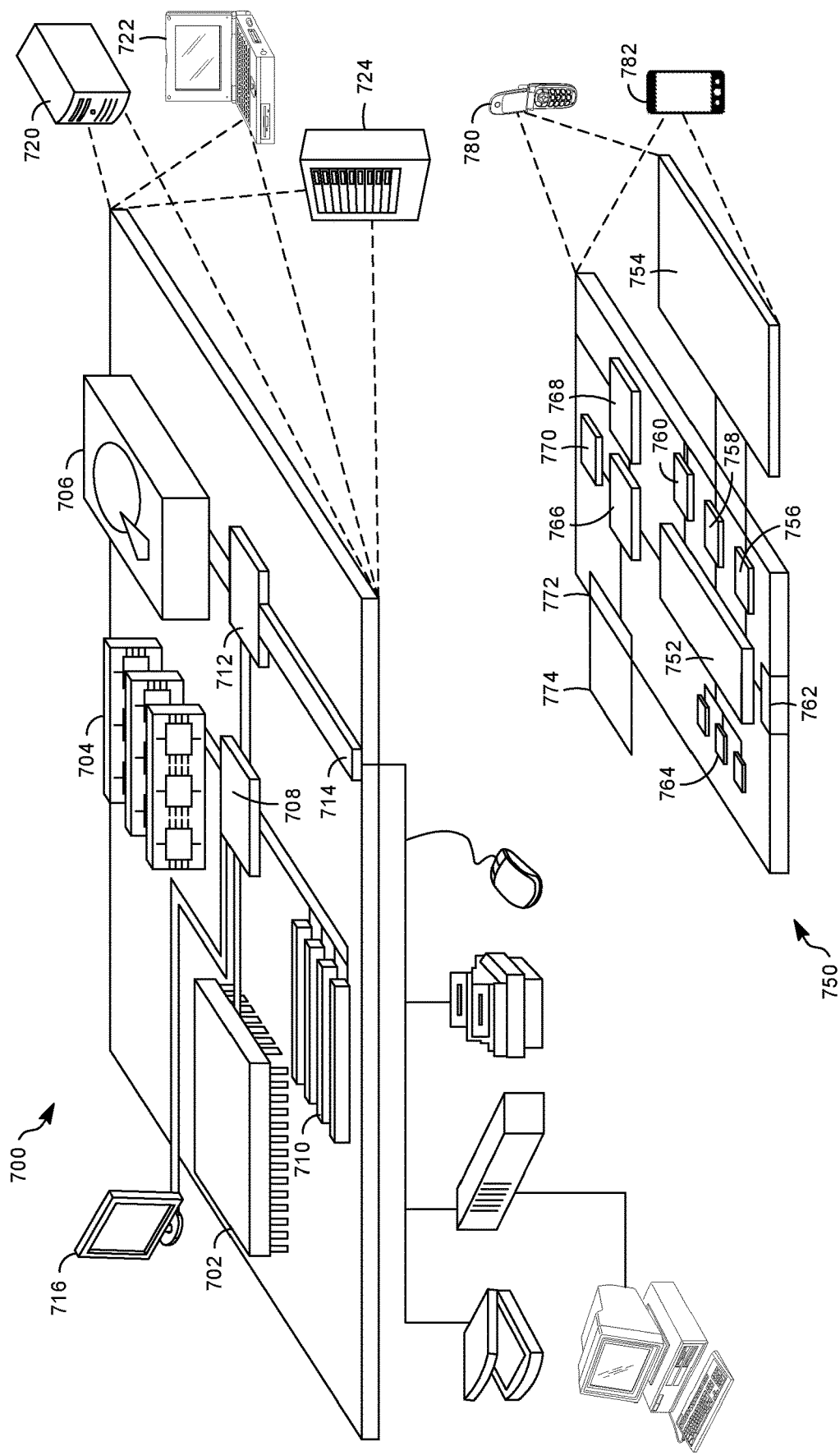

CONTROLLING HAPTIC RESPONSE TO CONTACT

CROSS REFERENCE TO RELATED APPLICATION

This application is a 35 U.S.C. § 371 National Phase Entry Application from PCT/US2020/022054 filed Mar. 11, 2020 designating the U.S., the disclosure of which is incorporated herein by reference in its entirety.

TECHNICAL FIELD

This description relates to tactile feedback from computing devices.

BACKGROUND

Some computing devices include touchscreen displays that can receive input by contact directly on the display. However, the contact into the display can obscure the user's view of the display, making it difficult for the user to provide input into the correct location on the display.

SUMMARY

According to an example, a computing device can include a cover, a texture haptics layer adjacent to the cover, a display layer adjacent to the texture haptics layer, an impact haptics layer adjacent to the display layer, a controller, and a housing enclosing the controller and supporting the cover, the texture haptics layer, the display layer, and the impact haptics layer. The controller can be configured to activate the texture haptics layer in response to an object moving along the cover, control an image presented by the display layer, and activate the impact haptics layer in response to the object contacting the cover.

According to an example, a computing device can include a touchscreen comprising at least a first actuator and a second actuator, a controller configured to activate the at least the first actuator and the second actuator in response to detecting contact on the touchscreen, a force that the first actuator generates being based on a proximity of the detected contact to the first actuator and a force that the second actuator generates being based on a proximity of the detected contact to the second actuator, and a housing supporting the touchscreen and the controller.

According to an example, a non-transitory computer-readable storage medium can include instructions stored thereon. When executed by at least one processor, the instructions can be configured to cause a computing device to activate a texture haptics layer of the computing device based on determining that an object is moving along a display of the computing device, and activate an impact haptics layer of the computing device based on determining that the object has contacted the display.

The details of one or more implementations are set forth in the accompanying drawings and the description below. Other features will be apparent from the description and drawings, and from the claims.

BRIEF DESCRIPTION OF THE DRAWINGS

FIG. 7 shows an example of a computer device and a mobile computer device that can be used to implement the techniques described here.

Like reference number refer to like elements.

DETAILED DESCRIPTION

A computing system, such as a smartphone, a tablet computing device, a laptop or notebook computing device, or personal computer, can include a display that provides both texture-type haptic feedback and impact-type haptic feedback. The texture-type haptic feedback can increase friction along the display when the user is moving an object, such as the user's finger, along the display, which can inform the user that he or she has reached a boundary point that may be obscured by his or her finger. The impact-type haptic feedback can produce vibrations in response to the object contacting the display, which can inform the user that the user has contacted a virtual button. In some examples, the display can include a touchscreen display that receives touch input in addition to outputting the texture-type haptic feedback and the impact-type haptic feedback. Accordingly, a computing system, such as a computing device, can be provided enabling types of interaction between a user and the computing system (e.g., computing device) which may be applied in order to avoid obscuring the user's view of the display and/or improper operation of the computing system.

Figure 1A:
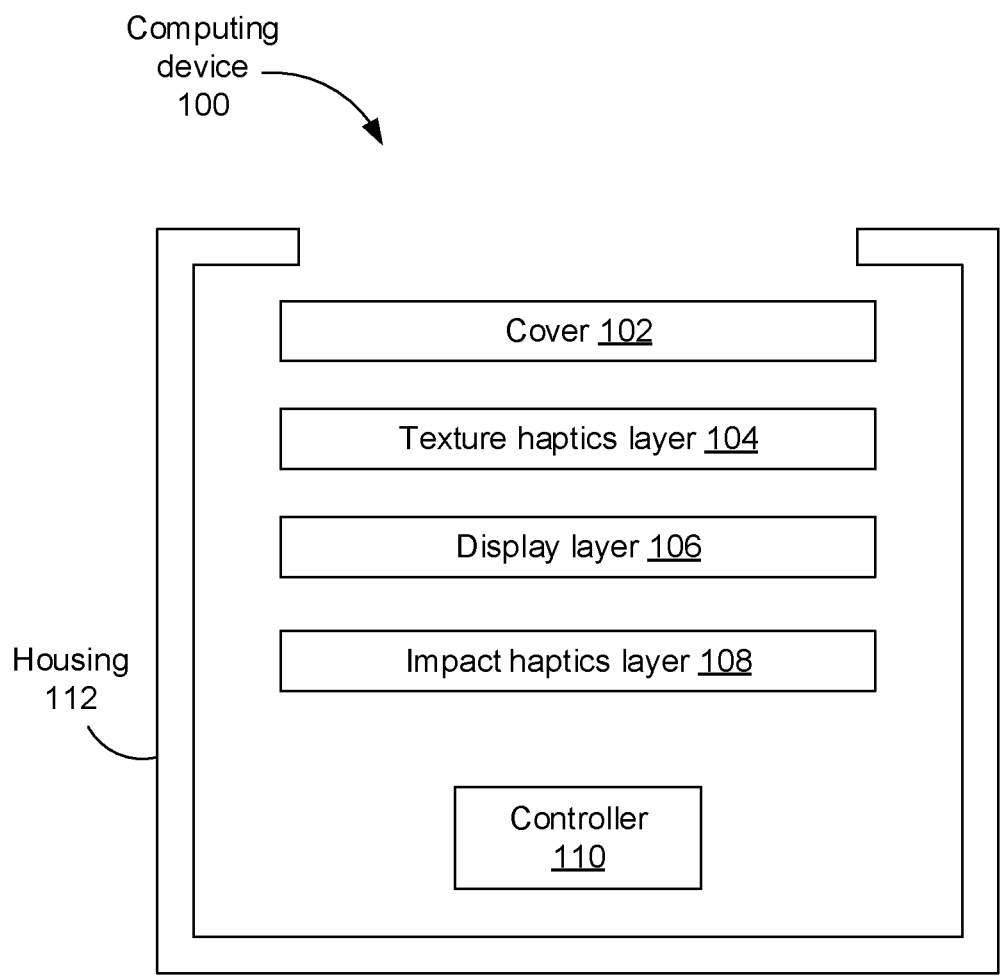
FIG. 1A is an exploded cross-sectional view of a computing device according to an example implementation.

FIG. 1A is an exploded cross-sectional view of a computing device 100 according to an example implementation. The cross-sectional view is shown along the cut line 'A' shown in FIG. 1B. The computing device 100 shown in FIG. 1A can include a standalone computing device, such as a smartphone or a tablet computing device, or can include a display that can be coupled to a computing device.

The computing device 100 can include a cover 102. The cover 102 can include a transparent, rigid material, such as glass or plastic. The cover 102 can be exposed, so that the user can contact the cover with an object, such as the user's finger, to provide input to the computing device 100.

The computing device 100 can include a texture haptics layer 104. The texture haptics layer 104 can be adjacent to the cover 102. The texture haptics layer 104 can increase friction experienced by the object moving along the cover 102. The texture haptics layer 104 can increase the friction by generating an electric field and/or a magnetic field that attracts the object toward the texture haptics layer 104. The texture haptics layer 104 can be transparent, allowing images generated by a display layer 106 (described below) to be viewed from outside the computing device 100.

In some examples, the texture haptics layer 104 can include an electrode grid layer, and/or a grid of electrodes. An example of the grid of electrodes is shown in FIG. 4B. In some examples, the texture haptics layer 104 and/or electrode grid layer can include at least two orthogonal electrode lines, such as a first electrode line and a second electrode line orthogonal to the first electrode line.

In some examples, the texture haptics layer 104 can include multiple actuators, such as piezoelectric actuators and/or Z-axis actuators. In some examples, the texture haptics layer 104 can include ultrasound actuators that create vibrations in the cover 102.

In some examples, the texture haptics layer 104 can include touchscreen technology to receive and process touch input. The texture haptics layer 104 can, for example, include one or more resistive touch sensors or one or more capacitive touch sensors to detect location(s) and/or force(s) of an object(s) contacting the cover 102.

The computing device 100 can include the display layer 106. The display layer 106 can be adjacent to the texture haptics layer 104. The display layer 106 can generate graphical and/or visual output. The display layer 106 can include, for example, a liquid crystal display (LCD), a plasma display, or a light-emitting diode (LED) display, as non-limiting examples.

Figure 5A:
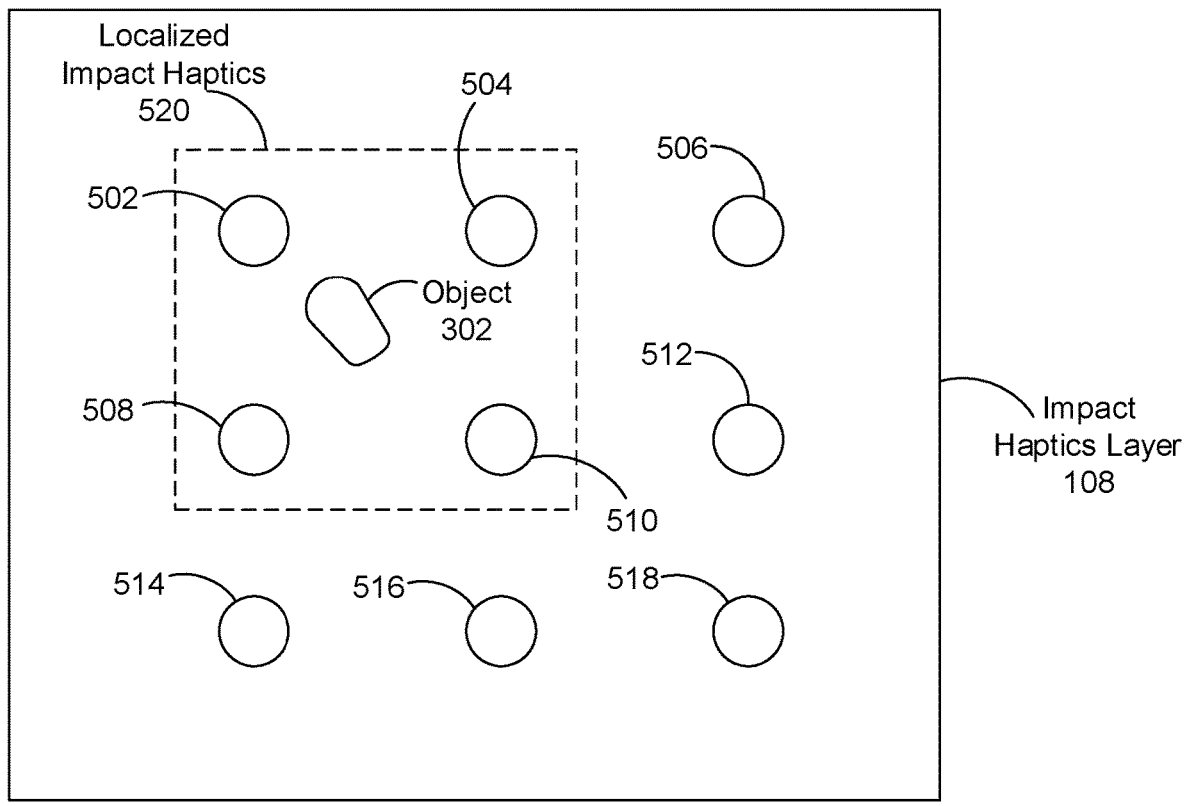
FIG. 5A is a top view of an impact haptics layer according to an example implementation.

The computing device 100 can include an impact haptics layer 108. The impact haptics layer 108 can generate vibrations. In some examples, the impact haptics layer 108 can generate vibrations in response to the display layer 106 detecting a contact and/or impact on the cover 102. In some examples, the impact haptics layer 108 can include at least one, and/or multiple, piezoelectric actuators. An example of the impact haptics layer 108 with a grid of piezoelectric actuators is shown in FIG. 5A.

In some examples, the impact haptics layer 108 can include one or more electromagnets. In some examples, the impact haptics layer 108 can include one more linear resonant actuators. In some examples, the cover 102, the texture haptics layer 104, the display layer 106, and the impact haptics layer 108 can collectively be referred to as a display.

The computing device can include a controller 110. The controller 110 can control and/or activate the texture haptics layer 104 and/or impact haptics layer 108 in response to input received and/or processed by the display layer 106. In some examples, the controller 110 can activate the texture haptics layer in response to an object moving along the cover 102. In some examples, the controller 110 can control one or more images presented and/or generated by the display layer 106. In some examples, the controller 110 can activate the impact haptics layer 108 in response to the object contacting the cover 102.

In some examples, the controller 110 can provide and/or output or more signals, such as one or more alternating current (AC) signals, to the texture haptics layer 104, such as to the electrode grid layer included in some examples of the texture haptics layer 104. In some examples, the controller 110 can control and/or change the friction experienced by the object moving along the cover by changing a frequency of the signal sent by the controller 110 to the texture haptics layer 104 and/or electrode grid layer included in the texture haptics layer 104. In some examples, the controller 110 can change the frequency of the signal based on a speed of the object moving along the cover 102, such as by increasing the frequency of the signal when the object is moving faster and/or reducing the frequency of the signal when the object is moving slower.

In some examples in which the texture haptics layer 104 includes an electrode grid layer that includes at least two orthogonal electrode lines, the controller 110 can generate an electric field at the electrode grid layers by providing alternating current signals to the at least two orthogonal electrode lines. In some examples, the controller 110 can provide a first alternating current signal to a first electrode line of the at least two orthogonal electrode lines, and the controller 110 can provide a second alternating current signal to a second electrode line of the at least two orthogonal electrode lines. In some examples, the first alternating current signal can have a same frequency as the second alternating current signal. In some examples, the first alternating current signal can be out of phase with the second alternating current signal, such as by ninety degrees (90°) and/or between eighty-five degrees (85°) and ninety-five degrees (95°).

In some examples, the controller 110 can reduce power consumption by allowing only one of the texture haptics layer 104 and impact haptics layer 108 to be active at a given time. In some examples, the controller 110 can deactivate the impact haptics layer 108 when the texture haptics layer 104 is active, such as when an object is moving along the cover 102. In some examples, the controller 110 can deactivate the texture haptics layer 104 when the impact haptics layer 108 is active, such as when an object initially contacts the cover 102.

In some examples, the controller 110 can deactivate the texture haptics layer 104 based on determining that the object is no longer moving along the cover 102. The lack of movement along the cover eliminates friction, obviating any need for the texture haptics layer 104 to be active.

In some examples, the controller 110 can activate the texture haptics layer 104 in response to an object moving along the cover 102 from a starting location on the cover 102 to a predetermined ending location on the cover 102. The ending location on the cover can be a boundary of an object presented by the display layer 106, such as the end of a list.

The computing device 100 can include a housing 112. The housing 112 can protect components of the computing device 100, and/or maintain the respective locations and/or arrangements of the components with respect to each other. In some examples, the controller 110 can enclose the controller 110. In some examples, the housing 112 can support the cover 102, the texture haptics layer 104, the display layer 106, and/or the impact haptics layer 108.

Figure 1B:
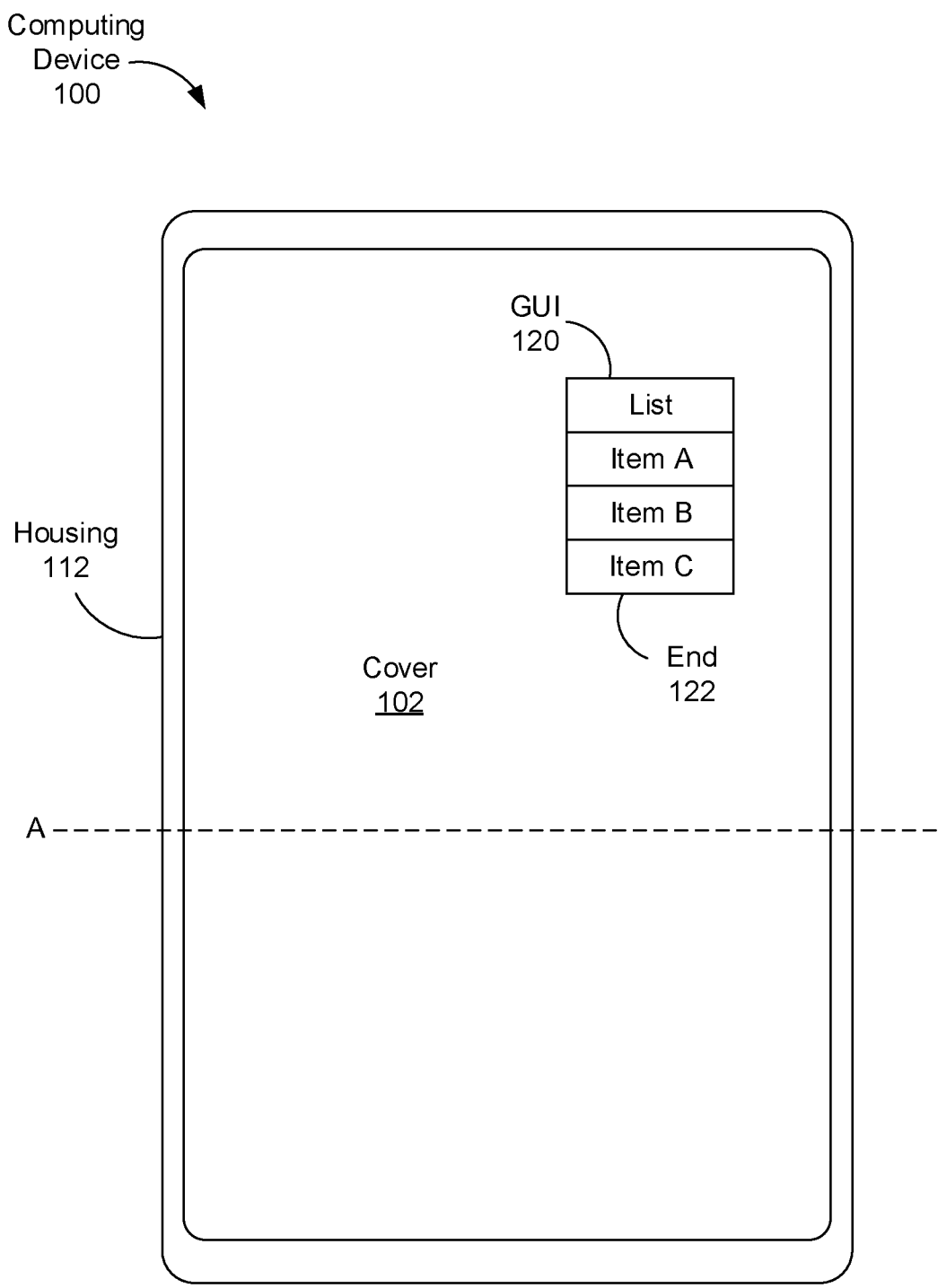
FIG. 1B is a top view of the computing device according to an example implementation.

FIG. 1B is a top view of the computing device 100 according to an example implementation. In this example, the housing 112 surrounds and/or supports the cover 102. FIG. 1B shows the cut line 'A' from which the cross-sectional view of FIG. 1A was shown.

In some examples, the display layer 106 (not shown in FIG. 1B) can present an object, such as a graphical user interface (GUI) 120, through the cover 102. In the example shown in FIG. 1B, the GUI 120 is a list. The user can slide an object, such as the user's finger, along the GUI 120 from a starting location on the cover 102, such as from inside the top box that includes the word, "List," to a predetermined ending location on the cover 102, such as the bottom and/or end 122 of the GUI 120. The controller 110, not shown in FIG. 1B, can activate the texture haptics layer 104, not shown in FIG. 1B, in response to determining that the object has reached and/or contacted the predetermined ending location, such as the end 122. The activation of the texture haptics layer 104 can increase the friction experienced by the object, giving the user the feeling that he or she has reached a boundary and should stop moving the object along the cover 102, despite his or her view of the GUI 120 being obscured by his or her finger.

Figure 2:
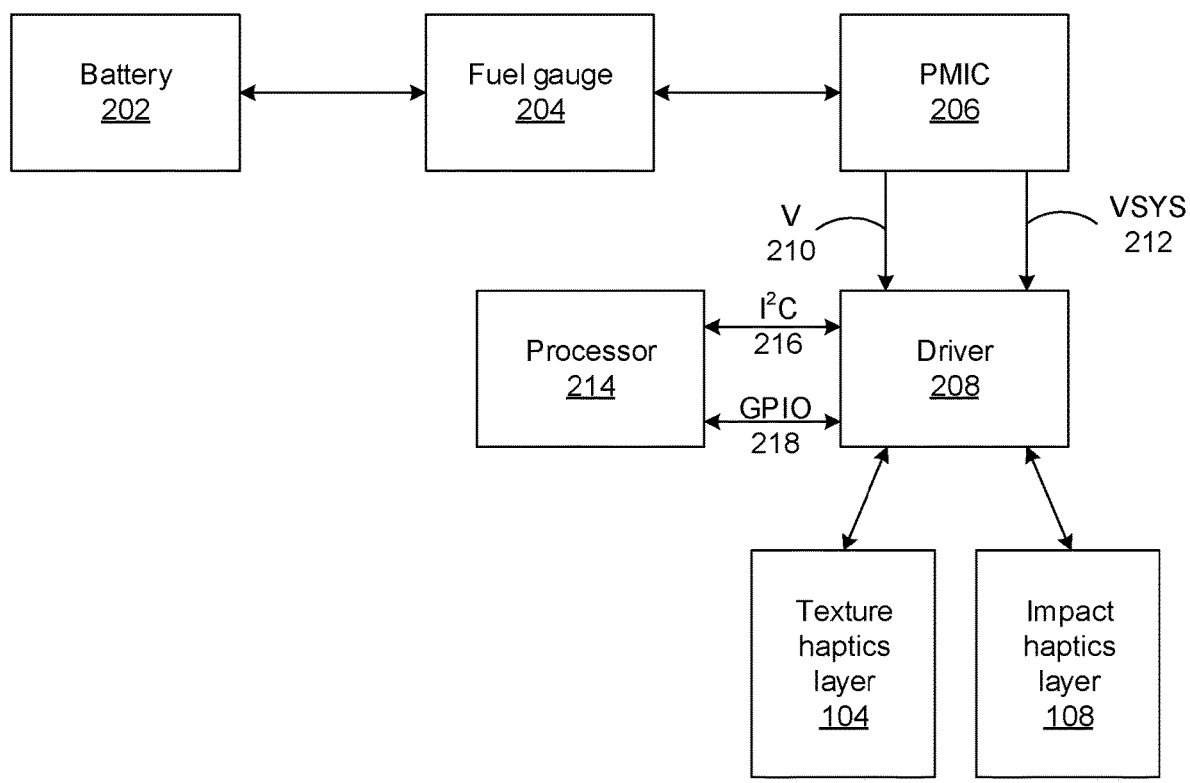
FIG. 2 is a schematic view of a power architecture of the computing device according to an example implementation.

FIG. 2 is a schematic view of a power architecture of the computing device 100 according to an example implementation. In some examples, a battery 202, fuel gauge 204, Power Management Integrated Circuit (PMIC) 206, driver 208, and/or processor 214, and be considered components of the controller 110 shown and described with respect to FIG. 1A.

The computing device 100 can include a battery 202. The battery can provide power, such as by outputting electric current, to components of the computing device 100, such as the texture haptics layer 104, the display layer 106, the impact haptics layer 108, and/or the controller 110. In some examples, the battery 202 be a rechargeable battery.

The computing device 100 can include a fuel gauge 204. The fuel gauge 204 can determine a power level, and/or remaining charge available, in the battery 202. In some examples, the controller 110 can instruct the display layer 106 to output and/or present a power level based on the power level determined by the fuel gauge 204.

The computing device 100 can include the PMIC 206. The PMIC 206 can provide power to the driver 208. The PMIC 206 can provide a constant voltage V 210, such as 1.8 volts, and/or a system voltage (VSYS) 212, to the driver 208.

The computing device 100 can include the driver 208. The driver 208 can provide and/or output instructions directly to the texture haptics layer 104 and/or the impact haptics layer 108. The driver 208 can provide and/or output instructions directly to the texture haptics layer 104 and/or the impact haptics layer 108 based on instructions that the driver 208 receives from the processor 214.

The processor 214 can provide instructions to the driver 208 based on instructions stored in memory and input received and/or processed by the display layer 106. The processor 214 can communicate with the driver 208 via an Inter-Integrated Circuit (I$^2$C) 216 and/or via a General Purpose Input/Output (GPIO) 218.

Figure 3:
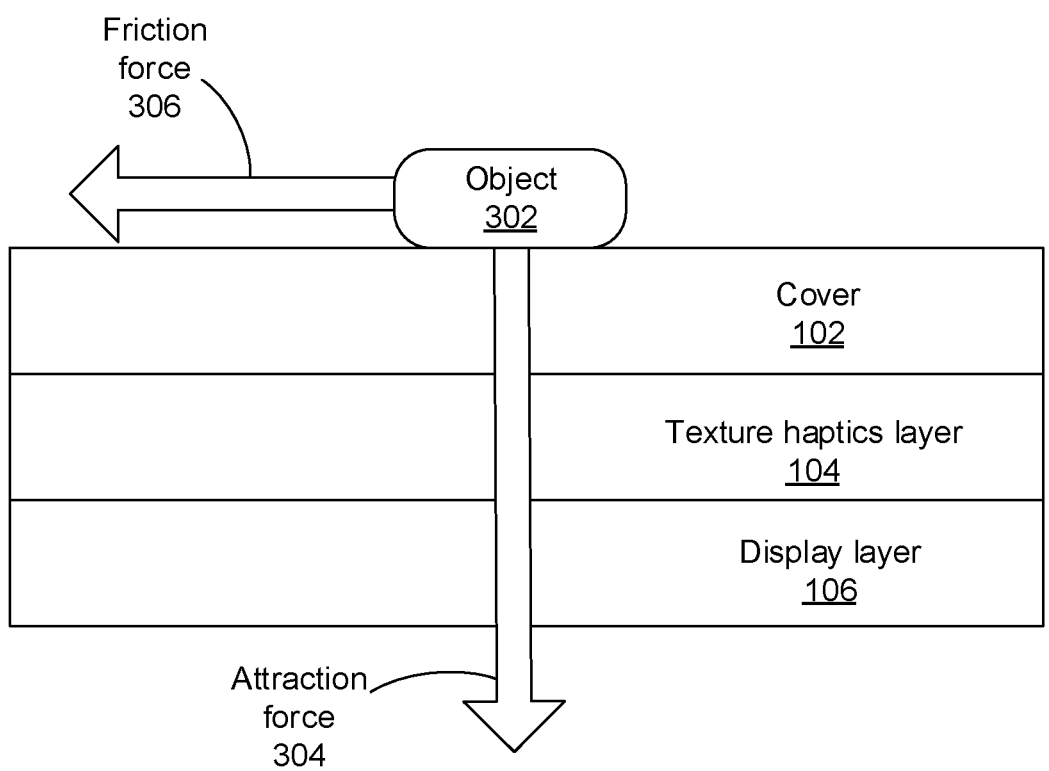
FIG. 3 shows attractive and frictional forces exerted on an object in contact with a cover of the computing device according to an example implementation.

FIG. 3 shows attractive and frictional forces 304, 306 exerted on an object 302 in contact with the cover 102 of the computing device 100 according to an example implementation. The texture haptics layer 104 can cause electrostatic attraction, such as by generating an electromagnetic field, between the object 302 and the texture haptics layer 104. The object 302 can include the user's finger. In some examples, the electromagnetic field can be generated by the controller 110 (not shown in FIG. 3) sending and/or outputting alternating current signals to orthogonal electrode lines included in the texture haptics layer 104. The object 302 can be considered a grounded electrode that is attracted to the electrode(s) included in the texture haptics layer 104.

The attraction force 304 in a direction normal to the cover 102 can be expressed as $F_e = \frac{1}{2}\epsilon S(V/d)^2$, where $\epsilon$ is the dielectric constant, S is the contact area of the object 302 on the cover 102, V is the voltage difference between the object 302 and the texture haptics layer 104, and d is the distance between the object 302 and the texture haptics layer 104. The friction force 306 opposing the user's movement of the object 302 along the cover 102 can be expressed as Force=$\mu$ ($F_e$+N), where $\mu$ is the friction coefficient and N is the normal force applied by the user in the direction normal to the cover 102. The attraction force 304 generated by the texture haptics layer increases the friction force 306, creating a noticeable change that can prompt the user to stop moving the object along the cover 102.

Figure 4A:
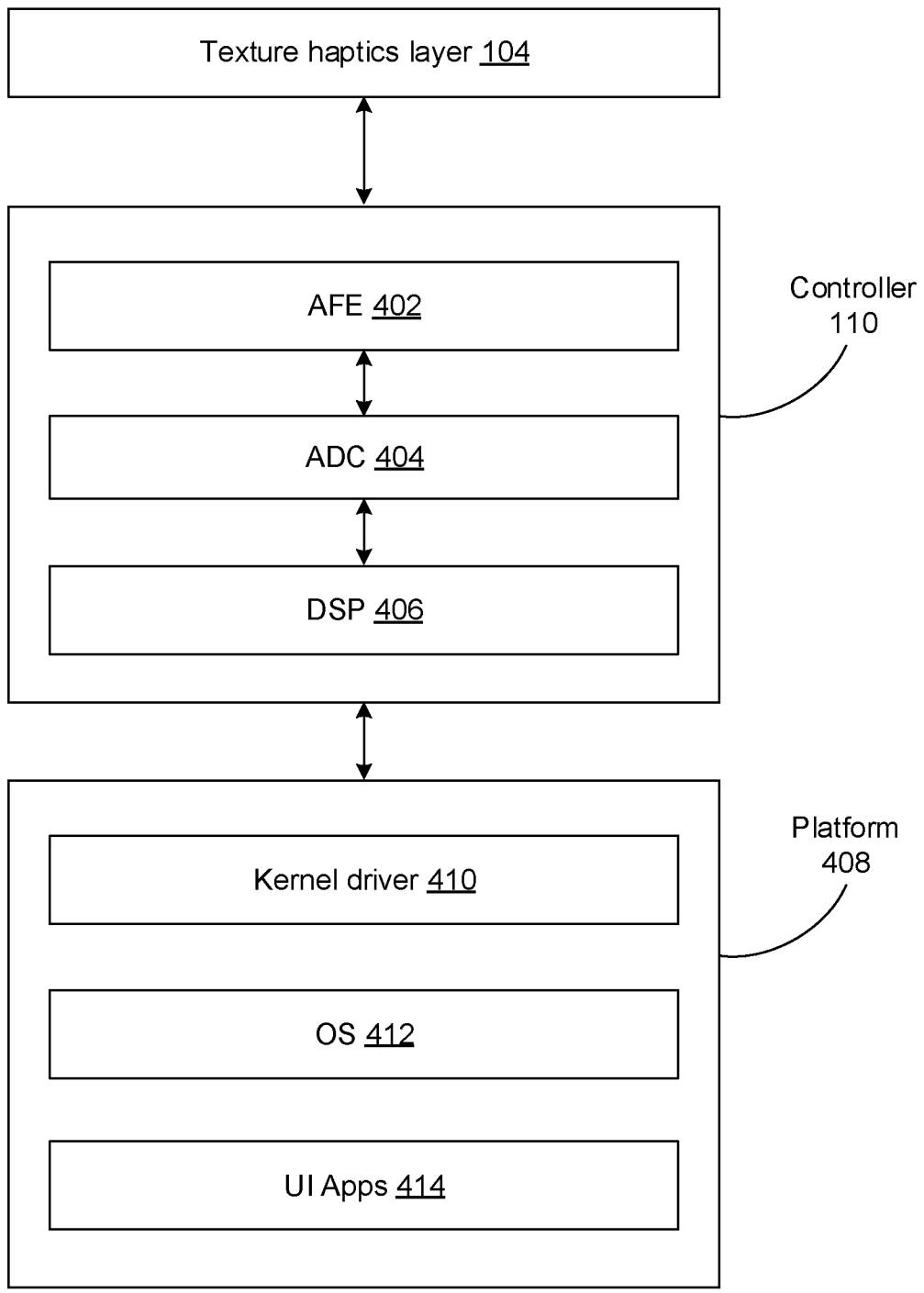
FIG. 4A is a schematic view of components of the computing device that provide texture feedback according to an example implementation.
Figure 4B:
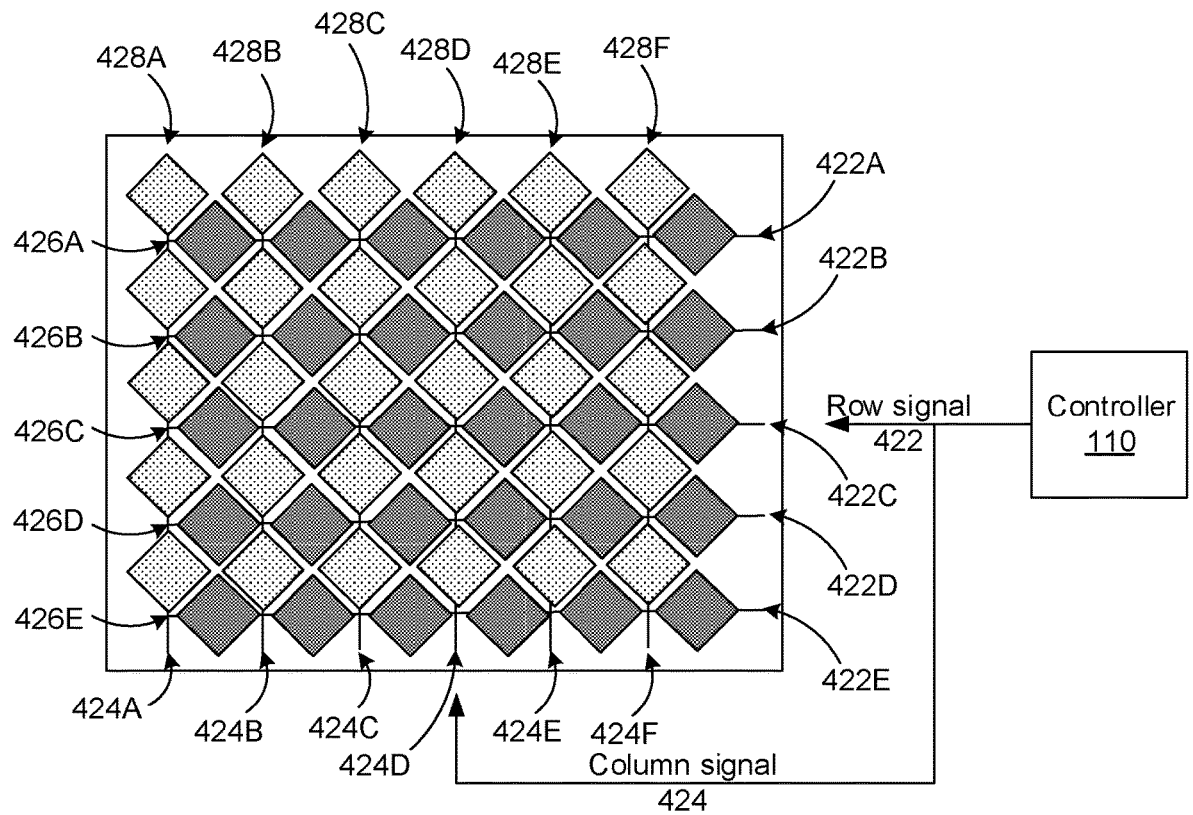
FIG. 4B is a top view of a texture haptics layer according to an example implementation.

FIG. 4A is a schematic view of components of the computing device 100 that provide texture feedback according to an example implementation. The texture haptics layer 104 can be in communication with, and/or controlled by, the controller 110.

The controller 110 can include an analog front end (AFE) 402 that provides and/or outputs analog signals, such as alternating current signals, to the texture haptics layer 104. The controller 110 can include an analog-to-digital converter (ADC) 404. The ADC 404 can convert digital signals into the analog waveforms to be sent to the texture haptics layer 104. The controller 110 can include a digital signal processor (DSP) 406. The DSP 406 can receive and/or process digital signals and provide the digital signals to the ADC 404.

The computing device 100 can include a platform 408 in communication with the controller 110. The platform 408 can include a kernel driver 410. The kernel driver 410 can provide a software interface between an operating system 412 and components of the computing device 100, such as the controller. The platform 408 can include and/or execute an operating system (OS) 412. The OS 412 can manage the hardware and software resources of the computing device 100, including any of the components described herein. The platform 408 can include and/or execute user interface applications (UI Apps 414), such as applications that prompt the display layer 106 to present output such as the GUI 120 shown in FIG. 1B and prompt the controller 110 to activate texture haptics layer 104 and/or impact haptics layer 108 in response to specific inputs.

In some examples, the controller 110 can provide and/or output an alternating current driving signal, such as a sinusoidal alternating current driving signal, to one or more electrode grids on the texture haptics layer 104. The alternating current driving signal can generate a localized electrostatic force, such as the attraction force 304 shown and described with respect to FIG. 3, to provide haptic feedback to a user. In some examples, the electrode grid included in the texture haptics layer 104 can also sense and/or process touch input by self capacitive and/or mutual capacitive sensing. In some examples, the alternating current driving signal can have an amplitude of fifty volts and two hundred Hertz. In some examples, haptic feedback can trigger undesired, and/or ghost stimulation on the electrode grid. To eliminate the ghost stimulation, the controller can provide signals to electrode lines, including orthogonal electrode lines, with a phase difference, such as a phase difference of approximately ninety degrees (such as between eighty-five degrees and ninety-five degrees) (which can render the signals orthogonal to each other).

FIG. 4B is a top view of a texture haptics layer 104 according to an example implementation. In this example, the texture haptics layer 104 can include multiple rows 426A, 426B, 426C, 426D, 426E of electrodes and multiple columns 428A, 428B, 428C, 428D, 428E, 428F of electrodes. The rows 426A, 426B, 426C, 426D, 426E of electrodes can be orthogonal to the columns 428A, 428B, 428C, 428D, 428E, 428F of electrodes.

In this example, the controller 110 can output a row signal 422 and a column signal 424. The texture haptics layer 104 can include row nodes 422A, 422B, 422C, 422D, 422E that receive the row signal 422 and column nodes 424A, 424B, 424C, 424D, 424E, 424F that receive the column signal 424. In some examples, the row signal 422 and column signal 424 can have a same frequency, but be out of phase with each other, such as by approximately ninety degrees, to eliminate ghost stimulation of the electrodes included in the texture haptics layer 104.

Figure 4C:
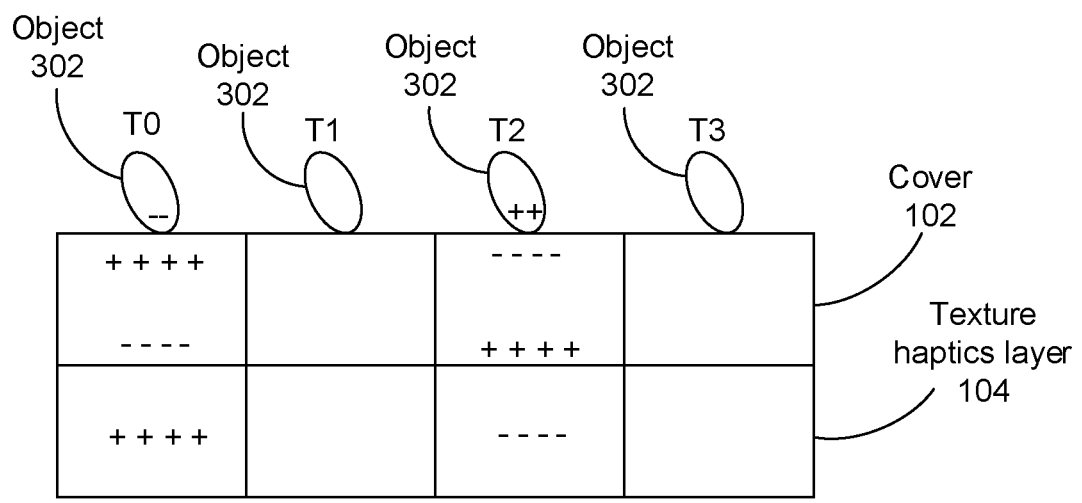
FIG. 4C shows electric charges generated by the texture haptics layer according to an example implementation.
Figure 4C:
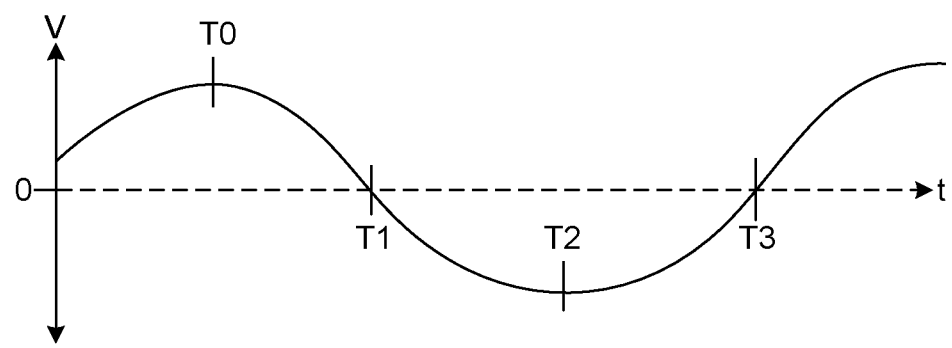

FIG. 4C shows electric charges generated by the texture haptics layer 104 according to an example implementation. The controller 110 generates and/or sends, to the texture haptics layer 104, an alternating current signal 450. The signal 450 can be a sinusoidal signal.

At time T0, the signal 450 is positive, and the texture haptics layer 104 is positively charged. The positive charge at the texture haptics layer 104 creates a negative layer at a bottom portion of the cover 102 nearest to the texture haptics layer 104, which also creates a positive layer at a top portion of the cover 102 farthest from the texture haptics layer 104 and/or nearest to the object 302. The positive layer at the top portion of the cover 102 becomes attracted to a negative portion of the object 302, attracting the object 302 to the cover 102, creating the attraction force 304 and increasing the friction force 306.

At time T1, the signal 450 is zero. With the signal 450 at zero, none of the texture haptics layer 104, cover 102, or object 302 are charged, and the attraction force 304 is zero.

At time T2, the signal 450 is negative, and the texture haptics layer 104 is negatively charged. The negative charge at the texture haptics layer 104 creates a positive layer at a bottom portion of the cover 102 nearest to the texture haptics layer 104, which also creates a negative layer at a top portion of the cover 102 farthest from the texture haptics layer 104 and/or nearest to the object 302. The negative layer at the top portion of the cover 102 becomes attracted to a positive portion of the object 302, attracting the object 302 to the cover 102, creating the attraction force 304 and increasing the friction force 306.

At time T3, the signal 450 is zero. With the signal 450 at zero, none of the texture haptics layer 104, cover 102, or object 302 are charged, and the attraction force 304 is zero.

The alternating current signal 450, which varies the voltage at the texture haptics layer 104 in a sinusoidal pattern, can increase the friction force 306. Increasing the frequency of the signal, and/or shortening the period shown by times T0, T1, T2, and T3, can increase the friction perceived by the user. The controller 110 can increase the frequency in response to faster movement of the object 302 on the cover 102, giving the user a stronger prompt to stop moving the object along the cover 102.

FIG. 5A is a top view of an impact haptics layer 108 according to an example implementation. The impact haptics layer 108 can include multiple actuators 502, 504, 506, 508, 510, 512, 514, 516, 518, and/or a grid of actuators 502, 504, 506, 508, 510, 512, 514, 516, 518. The actuators 502, 504, 506, 508, 510, 512, 514, 516, 518 can include piezoelectric actuators.

The computing device 100 can detect a contact and/or impact of an object 302. The computing device 100 can detect the contact and/or impact of the object 302 based on capacitive sensors included in the display layer 106, and/or based on one or more piezo transducers included in the impact haptics layer 108 (in some examples, the impact haptics layer 108 includes one or more piezo transducers). In response to detecting the contact and/or impact of the object 302, the controller 110 can concurrently actuate actuators 502, 504, 508, 510 that are adjacent to the object 302. The controller 110 can determine the four actuators 502, 504, 508, 510 that are adjacent to and/or closest to the object 302 to generate localized impact haptics 520.

Figure 5B:
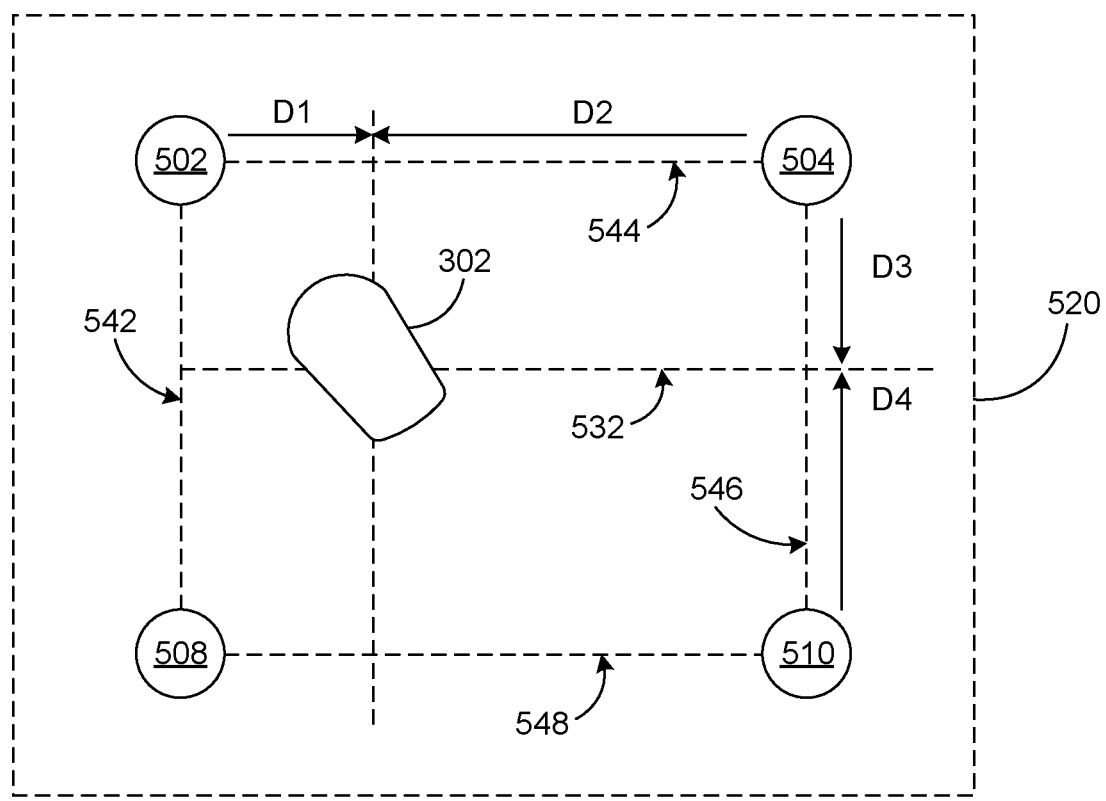
FIG. 5B is a top view of a portion of the impact haptics layer according to an example implementation.

FIG. 5B is a top view of a portion of the impact haptics layer 108 according to an example implementation. FIG. 5B shows the localized impact haptics 520 shown in FIG. 5A. The controller 110 can actuate the actuators 502, 504, 508, 510 with forces and/or magnitudes based on proximities of the respective actuators 502, 504, 508, 510 to the object 302. In some examples, the force and/or magnitudes of the actuators 502, 504, 508, 510 can increase linearly as measured distances of other actuators 502, 504, 508, 510.

The controller 110 can measure a first distance D1 of the object 302 from a line 542 between a first actuator 502 and a third actuator 508. The controller 110 can measure a second distance D2 of the object 302 from a line 546 between the second actuator 504 and a fourth actuator 510. The controller 110 can measure a third distance D3 of the object 302 from a line 544 between the first actuator 502 and the second actuator 504. The controller 110 can measure a fourth distance D4 of the object 302 from a line 548 between the third actuator 508 and the fourth actuator 510.

In some examples, the controller 110 can instruct the first actuator 502 to generate a force $f1=F*(D2+D4)/2L$, where F and L are constants (in some examples $L=D1+D2$), making the force of the first actuator 502 proportional to the sum of the distance D2 of the contact of the object 302 from the line 546 between the second actuator 504 and the fourth actuator 510 and the distance D4 of the contact of the object 302 from the line 548 between the third actuator 508 and the fourth actuator 510. In some examples, the controller 110 can instruct the second actuator 504 to generate a force $f2=F*(D1+D4)/2L$, making the force of the second actuator 504 proportional to the sum of the measured distance D1 of the contact of the object 302 from the line 542 between the first actuator 502 and the third actuator 508 and the measured distance D4 of the object from the line 548 between the third actuator 508 and the fourth actuator 510. In some examples, the controller 110 can instruct the third actuator 508 to generate a force $f3=F*(D2+D3)/2L$), making the force of the third actuator 508 proportional to the sum of the measured distance D2 of the contact of the object 302 from the line 546 between the second actuator 504 and the fourth actuator 510) and the measured distance D3 of the contact of the object 302 from the line 544 between the first actuator 502 and the second actuator 504. In some examples, the controller 110 can instruct the fourth actuator 510 to generate a force $f4=F*(D1+D3)/2L$, making the force of the fourth actuator proportional to the sum of the measured distance D1 of the contact of the object 302 from the line 542 between the first actuator 502 and the third actuator 508 and the measured distance D3 of the contact of the object 302 from the line from the line 544 between the first actuator 502 and the second actuator 504. The controller 110 can actuate actuators 502, 504, 508, 510 that are proximal to the object 302 without activating actuators that are greater than a maximum distance from the contact location of the object 302. In some examples, the maximum distance can be L or ½ L. Generating more force at actuators 502, 504, 508, 510 closer to the object 302, and/or less force at actuators 502, 504, 508, 510 farther from the object 302, can save power.

Figure 6:
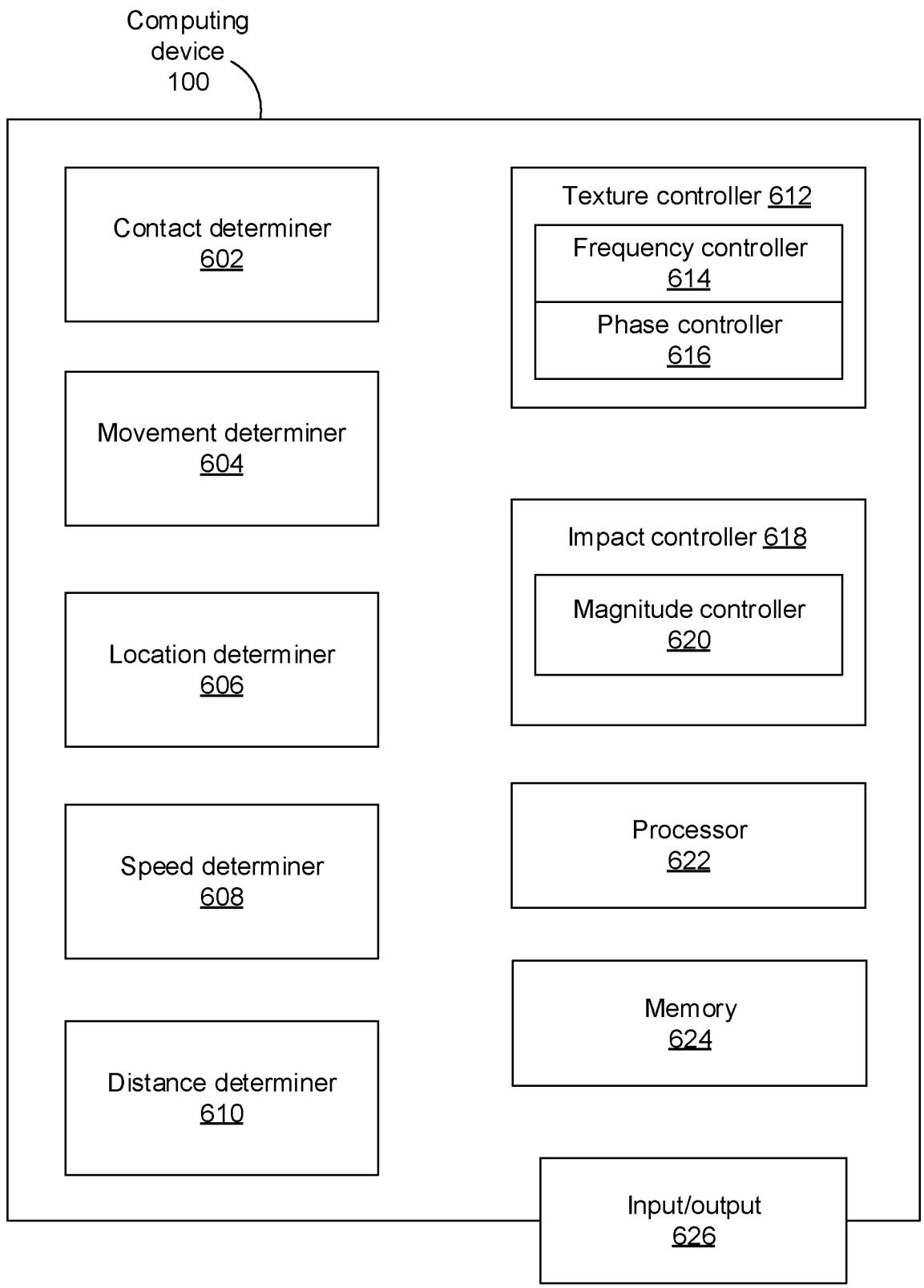
FIG. 6 is a block diagram of the computing system according to an example implementation.

FIG. 6 is a block diagram of the computing device 100 according to an example implementation. The computing device 100 can include a contact determiner 602. The contact determiner 602 can determine whether an object 302, such as a finger, has contacted the cover 102. The contact determiner 602 can determine whether the object 302 has contacted the cover 102 based on input from capacitive sensors or resistive sensors included in the display layer 106, or based on input from transducers included in the impact haptics layer 108, as non-limiting examples.

The computing device 100 can include a movement determiner 604. The movement determiner 604 can determine whether the object 302 is moving along the cover 102. The movement determiner 604 can determine that the object 302 is moving along the cover 102 based, for example, on changing input received from touch input components such as the capacitive sensors, resistive sensors, and/or transducers.

The computing device 100 can include a location determiner 606. The location determiner 606 can determine the location of the object 302 on the cover 102. The location determiner 606 can determine the location of the object 302 on the cover 102 based, for example, on input received from touch input components such as the capacitive sensors, resistive sensors, and/or transducers.

The computing device 100 can include a speed determiner 608. The speed determiner 608 can determine a speed at which the object 302 is moving along the cover 102. The speed determiner 608 can determine the speed at which the object is moving along the cover 102 based, for example, on changing input received from touch input components such as the capacitive sensors, resistive sensors, and/or transducers, and a clock or other device that measures time and which is included in the computing device 100.

The computing device 100 can include a distance determiner 610. The distance determiner 610 can determine the measured distance between the object 302 and actuators 502, 504, 508, 510, as discussed above with respect to FIGS. 5A and 5B. The distance determiner 610 can determine the measured distance based on the location of the object determined by the location determiner 606 and predefined locations of the actuators 502, 504, 508, 510 and/or lines 542, 544, 546, 548.

The computing device 100 can include a texture controller 612. The texture controller 612 can activate the texture haptics layer 104 in response to the movement determiner 604 determining that the object 302 is moving along the cover 102. In some examples, the texture controller 612 can activate the texture haptics layer 104 in response to the location determiner 606 determining that the object 302 has reached a boundary, such as the end 122 of the GUI 120 shown in FIG. 1B. Activating the texture haptics layer 104, which increases friction along the cover 102, can encourage the user to stop moving the object 302.

The texture controller 612 can include a frequency controller 614. The frequency controller 614 can control the frequency of the alternating signal sent to the texture haptics layer 104. A higher frequency signal can cause the perceived friction to be higher. In some examples, the frequency controller can increase the frequency based on the speed determiner 608 determining that the speed of the object 302 is higher, and decrease the frequency based on the speed determiner 608 determining that the speed of the object 302 is lower.

The texture controller 612 can include a phase controller 616. The phase controller 616 can control phases of signals sent to electrodes included in the texture haptics layer 104. In some examples, the phase controller 616 can cause electrodes, and/or electrode lines, that are orthogonal to each other, to have signals that are out of phase and/or orthogonal with each other, such as offset by about ninety degrees (such as between eighty-five degrees and ninety-five degrees).

The computing device 100 can include an impact controller 618. The impact controller 618 can control and/or activate the impact haptics layer 108 based on the contact determiner 602 determining that an object 302 has contacted the cover 102.

The impact controller 618 can include a magnitude controller 620. The magnitude controller 620 can control the magnitude of force generated by actuators included in the impact haptics layer 108. In some examples, the magnitude controller 620 can cause actuators closer to the object 302 to generate more force than actuators farther from the object 302, as discussed above with respect to FIGS. 5A and 5B.

The computing device 100 can include at least one processor 622. The at least one processor 622 can execute instructions, such as instructions stored in at least one memory device 624, to cause the computing device 100 to perform any combination of methods, functions, and/or techniques described herein.

The computing device 100 may include at least one memory device 624. The at least one memory device 624 can include a non-transitory computer-readable storage medium. The at least one memory device 624 can store data and instructions thereon that, when executed by at least one processor, such as the processor 622, are configured to cause the computing device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 100 can be configured to perform, alone, or in combination with the computing device 100, any combination of methods, functions, and/or techniques described herein.

The computing device 100 may include at least one input/output node 626. The at least one input/output node 626 may receive and/or send data, such as from and/or to, a server, and/or may receive input and provide output from and to a user. The input and output functions may be combined into a single node, or may be divided into separate input and output nodes. The input/output node 626 can include, for example, a touchscreen display (which can include the cover 102, the texture haptics layer 104, the display layer 106, and/or the impact haptics layer 108) that receives and processes input and provides haptic output, a speaker, a microphone, one or more buttons, and/or one or more wired or wireless interfaces for communicating with other computing devices.

FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory: Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below: In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760) may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a key board and a pointing device (e.g., a mouse or a trackball) by which the user can provide input to the computer. Other kinds of devices can be used to provide for interaction with a user as well: for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
   a cover;
   a texture haptics layer adjacent to the cover, wherein:
      the texture haptics layer comprises an electrode grid layer; and
      the electrode grid layer comprises at least two orthogonal electrode lines;
   a display layer adjacent to the texture haptics layer;
   an impact haptics layer adjacent to the display layer; and
   a controller configured to:
      activate the texture haptics layer in response to an object moving along the cover, wherein activating the texture haptics layer comprises:
         providing a first alternating current signal to a first electrode line;
         providing a second alternating current signal to a second electrode line, wherein:
            the first alternating current signal has a same frequency as the second alternating current signal; and
            the first alternating current signal is out of phase with the second alternating current signal;
      activate the impact haptics layer in response to the object contacting the cover; and
   a housing enclosing the controller and supporting the cover, the texture haptics layer, the display layer, and the impact haptics layer.

2. The computing device of claim 1, wherein the controller is configured to control a frequency of a signal sent to the electrode grid layer based on a speed of the object moving along the cover.

3. The computing device of claim 1, wherein the display layer comprises at least one capacitive touch sensor.

4. The computing device of claim 1, wherein the impact haptics layer comprises at least one piezoelectric actuator.

5. The computing device of claim 1, wherein the controller is configured to:
   deactivate the impact haptics layer when the texture haptics layer is active; and
   deactivate the texture haptics layer when the impact haptics layer is active.

6. The computing device of claim 1, wherein the controller is configured to deactivate the texture haptics layer based on determining that the object is no longer moving along the cover.

7. The computing device of claim 1, wherein the controller is configured to activate the texture haptics layer in response to the object moving along the cover from a starting location on the cover to a predetermined ending location on the cover.

8. A computing device comprising:
a touchscreen;
a texture haptics layer, wherein:
the texture haptics layer comprises an electrode grid layer; and
the electrode grid layer comprises at least two orthogonal electrode lines;
a controller configured to:
activate the texture haptics layer in response to an object moving along the touchscreen, wherein activating the texture haptics layer comprises:
providing a first alternating current signal to a first electrode line;
providing a second alternating current signal to a second electrode line, wherein:
the first alternating current signal has a same frequency as the second alternating current signal; and
the first alternating current signal is out of phase with the second alternating current signal; and
a housing supporting the touchscreen and the controller.

9. The computing device of claim 8, wherein the touchscreen further comprises at least a first actuator and a second actuator and the controller concurrently activates the first actuator and the second actuator in response to detecting contact on the touchscreen.

10. The computing device of claim 9, wherein the controller is further configured to:
activate the at least the first actuator and the second actuator in response to detecting contact on the touchscreen, a force that the first actuator generates being based on a proximity of the detected contact to the first actuator and a force that the second actuator generates being based on a proximity of the detected contact to the second actuator; and
activate at least the first actuator and the second actuator in response to detecting contact on the touchscreen without activating actuators that are at least a maximum distance from the contact.

11. The computing device of claim 10, wherein the force that the first actuator generates increases linearly as a function of a measured distance of the contact from the second actuator; and
the force that the second actuator generates increases linearly as a function of a measured distance of the contact from the first actuator.

12. The computing device of claim 11, wherein:
the touchscreen comprises at least the first actuator, the second actuator, a third actuator, and a fourth actuator; and
the controller is configured to activate the at least the first actuator, the second actuator, the third actuator, and the fourth actuator in response to detecting contact on the touchscreen, wherein:
the force that the first actuator generates is proportional to a sum of a measured distance of the contact from the second actuator and a measured distance of the contact from the fourth actuator;
the force that the second actuator generates is proportional to a sum of a measured distance of the contact from the first actuator and a measured distance of the contact from the fourth actuator;
the force that the third actuator generates is proportional to a sum of a measured distance of the contact from the second actuator and a measured distance of the contact from the third actuator; and
the force that the fourth actuator generates is proportional to a sum of a measured distance of the contact from the first actuator and a measured distance of the contact from the third actuator.

13. The computing device of claim 9, wherein:
the first actuator comprises a first piezoelectric actuator; and
the second actuator comprises a second piezoelectric actuator.

14. A computing device comprising:
a cover;
a texture haptics layer adjacent to the cover, wherein:
the texture haptics layer comprises an electrode grid layer; and
the electrode grid layer comprises at least two orthogonal electrode lines;
a display layer adjacent to the texture haptics layer;
a controller configured to:
activate the texture haptics layer in response to an object moving along the cover, wherein activating the texture haptics layer comprises:
providing a first alternating current signal to a first electrode line;
providing a second alternating current signal to a second electrode line, wherein:
the first alternating current signal has a same frequency as the second alternating current signal; and
the first alternating current signal is out of phase with the second alternating current signal; and
a housing enclosing the controller and supporting the cover, the texture haptics layer, and the display layer.

15. The computing device of claim 14, wherein the controller is further configured to cause the computing device to change a frequency of an alternating current signal flowing through the texture haptics layer based on a speed of the object moving along the display.

16. The computing device of claim 14, wherein the controller is further configured to cause the computing device to:
deactivate an impact haptics layer when the texture haptics layer is active; and
deactivate the texture haptics layer when the impact haptics layer is active.

17. The computing device of claim 14, wherein the controller is further configured to cause the computing device to control forces of actuators included in an impact haptics layer based on proximity of the object to the actuators.

* * * * *